United States Patent
Sugawara et al.

[11] Patent Number: 6,110,269
[45] Date of Patent: Aug. 29, 2000

[54] COATING LIQUID FOR FORMING HYDROPHILIC FILM AND METHOD FOR PRODUCING SAME

[75] Inventors: Satoko Sugawara, Kanagawa; Toshikazu Nishide, Fukushima; Takashi Seino, Kanagawa; Yasuaki Kai, Yokohama, all of Japan

[73] Assignee: Nissan Motor Co., Ltd., Kanagawa, Japan

[21] Appl. No.: 09/012,728

[22] Filed: Jan. 23, 1998

[30] Foreign Application Priority Data

Jan. 22, 1997 [JP] Japan ..................... 9-009901

[51] Int. Cl.$^7$ ............ C09D 1/00; C03G 17/25; C01B 33/14; C01G 23/047; B01J 13/00
[52] U.S. Cl. ............... 106/287.19; 427/384; 427/419.3; 427/419.5; 428/428; 428/432; 428/697
[58] Field of Search ............ 106/287.17, 287.19; 427/384, 419.3, 419.5; 428/428, 432, 697

[56] References Cited

U.S. PATENT DOCUMENTS

| | | |
|---|---|---|
| 4,829,437 | 5/1989 | Suzuki et al. . |
| 4,835,696 | 5/1989 | Suzuki et al. . |
| 4,845,622 | 7/1989 | Suzuki et al. . |
| 4,870,584 | 9/1989 | Etoh et al. . |
| 4,909,846 | 3/1990 | Barfurth et al. ............... 106/22 |
| 4,914,595 | 4/1990 | Suzuki et al. . |
| 4,926,334 | 5/1990 | Suzuki et al. . |
| 4,928,242 | 5/1990 | Suzuki . |
| 5,005,133 | 4/1991 | Takahashi . |
| 5,454,861 | 10/1995 | Hasegawa et al. ............ 106/2 |

FOREIGN PATENT DOCUMENTS

| | | |
|---|---|---|
| 0177198 | 9/1985 | European Pat. Off. . |
| 52-101680 | 8/1977 | Japan . |
| 53-58492 | 5/1978 | Japan . |
| 54-105120 | 8/1979 | Japan . |
| 55-154351 | 12/1980 | Japan . |
| 63-97234 | 4/1988 | Japan . |
| 2-223909 | 9/1990 | Japan . |
| 7-100378 | 4/1995 | Japan . |

*Primary Examiner*—David Brunsman
*Attorney, Agent, or Firm*—McDermott, Will & Emery

[57] ABSTRACT

The invention relates to a coating liquid for forming a hydrophilic film. This coating liquid comprises a first sol which is a titania sol; and a second sol which is at least one of a silica sol and an alumina sol. This titania sol is prepared by a method comprising the sequential steps of (a) mixing a first solution containing a titanium alkoxide with a diol represented by at least one of the following general formulas (1) and (2), thereby to prepare a second solution containing a titanium complex formed by a reaction of the titanium alkoxide with the diol; and (b) hydrolyzing the titanium complex in the second solution, thereby to prepare the titania sol. The coating liquid is stable or sufficiently long in pot life, and the hydrophilic film has a long time duration in hydrophilicity and a superior abrasion resistance.

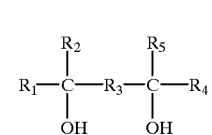

(1)

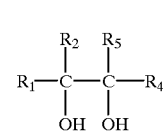

(2)

wherein $R_1$ is H or $C_pH_{2p+1}$ where p is from 1 to 5, $R_2$ is $C_qH_{2q+1}$ where q is from 1 to 5, $R_3$ is $C_rH_{2r}$ where r is from 1 to 3, $R_4$ is H or $C_xH_{2x+1}$ where x is from 1 to 5, and $R_5$ is H or $C_yH_{2y+1}$ where y is from 1 to 5.

24 Claims, No Drawings

COATING LIQUID FOR FORMING HYDROPHILIC FILM AND METHOD FOR PRODUCING SAME

The contents of Japanese Patent Application Nos. 9-9901, with a filing date of Jan. 23, 1997, are hereby incorporated by reference.

BACKGROUND OF THE INVENTION

The present invention relates to a coating liquid for forming a hydrophilic film on the surface of a substrate made of material such as glass, mirror, metal, or the like, and a method for producing such coating liquid.

Hitherto, for example, inorganic plate glass has been widely used for various articles such as window pane, mirror and eyeglass lenses, by the reason of its transparency and other good characteristics. When such article is used, for example, in a place of high temperature and high humidity, the dew condensation is caused on its surface, thereby to fog the same. In addition to this fogging problem, there has been another problem, for example, in the automotive outside mirror, to have many raindrops on its surface in the rainy weather. These problems interfere with the automotive rear view of the driver. Thus, there have been various proposals to provide the above-mentioned articles with antifogging property, water-drops preventive property, and durability. For example, there has been a proposal to form a hydrophilic film on the surface of a substrate such as glass plate, for the purpose of preventing fogging and the water-drops attachment thereto. There has been known for a long time a proposal of applying a surface active agent to the surface of such substrate, for achieving this purpose. For example, Japanese Patent Unexamined Publication JP-A-52-101680 discloses an antifogging agent for transparent article such as glass. This agent contains polyacrylic acid, a surface active agent, and a solvent which is water and/or alcohol. JP-A-55-154351 discloses a hydrophilic film formed on substrate. This film contains a phosphorus oxide and at least one of a molybdenum oxide and a tungsten oxide. JP-A-54-105120 discloses a method for producing an antifogging glass article by contacting an inorganic glass substrate containing $P_2O_5$, with a $P_2O_5$—containing liquid or vapor. Furthermore, JP-A-53-58492 discloses an antifogging agent containing at least one sulfonic-acid-type amphoteric surface active agent represented by a general formula disclosed therein, and at least one particular inorganic salt or acetate represented by a general formula disclosed therein.

There are some proposals of forming a titania film on a substrate, for the purpose of decomposing contaminants or odorants contained in water or air by the photocatalytic activity of the titania film. For example, JP-A-63-97234 discloses a photocatalyst made of titanium oxide and an additive which is at least one element selected from the group consisting of platinum, palladium, and rhodium. JP-A-2-223909 discloses a multilayer coating film formed on eye glasses. This coating film is made up of a first layer of $SiO_2$, a second color layer, and a third layer of $TiO_2$, and each of these layers is formed by physical vapor deposition (PVD). JP-A-7-100378 discloses a photocatalytic titanium oxide thin film. This film is prepared by a method comprising the sequential steps of (a) mixing a titanium alkoxide with an alcohol amine, to prepare a titania sol; (b) applying the titania sol to a substrate; and (c) baking the resultant titania sol film by increasing its temperature from room temperature to a final temperature of from 600 to 700° C. The resultant titania film is of the anatase type. After such titania film is irradiated with ultraviolet rays, contaminants attached to the titania film are decomposed by the photocatalytic activity of the titania film. With this, the titania film becomes hydrophilic. However, if such a conventional titania film is not irradiated with light for a long time, organic contaminants accumulate gradually on the titania film. With this, the titania film becomes inferior in hydrophilicity.

SUMMARY OF THE INVENTION

It is therefore an object of the present invention to provide a coating liquid, which is sufficiently long in pot life, for forming a hydrophilic film having a long time duration in hydrophilicity and a superior abrasion resistance.

It is another object of the present invention to provide a method for producing such coating liquid.

It is still another object of the present invention to provide a method for forming such hydrophilic film on a substrate, using such coating liquid.

It is a further object of the present invention to provide a hydrophilic article having such hydrophilic film formed on a substrate, using such coating liquid.

According to the present invention, there is provided a coating liquid for forming a hydrophilic film. This coating liquid comprises a first sol which is a titania sol; and a second sol which is at least one of a silica sol and an alumina sol. This titania sol is prepared by a method comprising the following sequential steps of (a) mixing a first solution containing a titanium alkoxide with a diol represented by at least one of the following general formulas (1) and (2), thereby to prepare a second solution containing a titanium complex formed by a reaction of the titanium alkoxide with the diol; and (b) hydrolyzing the titanium complex in the second solution, thereby to prepare the titania sol,

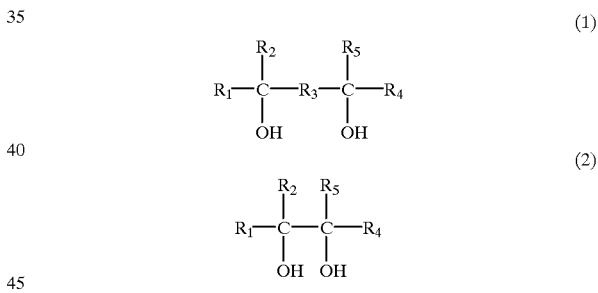

wherein $R_1$ is H or $C_pH_{2p+1}$ where p is from 1 to 5, $R_2$ is $C_qH_{2q+1}$ where q is from 1 to 5, $R_3$ is $C_rH_{2r}$ where r is from 1 to 3, $R_4$ is H or $C_xH_{2x+1}$ where x is from 1 to 5, and $R_5$ is H or $C_yH_{2y+1}$ where y is from 1 to 5.

According to the present invention, there is provided a first method for producing the above-mentioned coating liquid. This method comprises the step of (c) mixing the titania sol with the second sol, after the above-mentioned sequential steps of (a) and (b).

According to the present invention, there is provided a second method for forming a hydrophilic film on a substrate. This method comprises the following sequential steps of (d) applying the coating liquid obtained by the step (c) to the substrate, thereby to form a precursory film thereon; and (e) baking the precursory film at a temperature of from 300 to 850° C., thereby to form the hydrophilic film thereon.

According to the present invention, there is provided a hydrophilic article comprising a substrate; and a hydrophilic film formed on the substrate by the second method.

In the invention, as mentioned hereinabove, there is used a special titanium complex formed by a reaction of a titanium alkoxide with a diol of the above-mentioned special type. With this, the coating liquid becomes stable or sufficiently long in pot life, and the hydrophilic film has a long time duration in hydrophilicity and a superior abrasion resistance.

DESCRIPTION OF THE PREFERRED EMBODIMENTS

As stated above, if a conventional titania film is not irradiated with light for a long time, organic contaminants accumulate gradually on the titania film. With this, the titania film becomes inferior in hydrophilicity. In order to cure this defect, it is proposed to form a hydrophilic film made of a mixture of titania and another metal oxide (e.g., silica and alumina). This hydrophilic film is expected to have a long time duration in hydrophilicity. Such hydrophilic film can easily be formed on a substrate by the sol-gel process. This process for forming a hydrophilic film not according to the invention may comprise the following sequential steps of (1) hydrolyzing a titanium alkoxide, to prepare a conventional titania sol; (2) mixing this titania sol with another sol of silica and/or alumina, to prepare a sol mixture; (3) applying the sol mixture to a substrate, to form thereon a precursory film; and (4) baking the precursory film, to form the hydrophilic film. In this process, however, conventional titania alkoxides have very fast hydrolysis rates. Therefore, the sol mixture (coating liquid) obtained by the step (2) will have a white precipitate or turn into a gel in a short period of time. With this, it becomes difficult to form a transparent film. In other words, this coating liquid not according to the present invention is insufficient in pot life. In contrast, according to the present invention, the coating liquid becomes sufficiently long in pot life, as mentioned hereinabove.

In the invention, particularly preferable examples of the diol are 2-ethyl-1,3-hexanediol, 2,2,4-trimethyl-1,3-pentanediol, 1,2-butanediol, 1,3-butanediol, 2,3-butanediol, 2-methyl-2,4-pentanediol, and a combination of at least two of these. Due to the use of this diol, the resultant coating liquid becomes substantially stable, and the hydrophilic film has the above-mentioned mentioned superior characteristics.

In the invention, the titanium alkoxide is not particularly limited, and preferably has a carbon atom number of from 1 to 5 in the molecule. Nonlimitative examples of the titanium alkoxide are titanium methoxide, titanium ethoxide, titanium n-propoxide, titanium iso-propoxide, titanium n-butoxide, titanium iso-butoxide, and titanium sec-butoxide. In the invention, the titanium alkoxide is dissolved in an organic solvent, to prepare a first solution. This organic solvent is not particularly limited, as long as it dissolves the titanium alkoxide and the diol. Examples of this organic solvent are primary alcohols such as methanol, ethanol and propyl alcohol, secondary alcohols such as isopropyl alcohol, tertiary alcohols such as tertiary butanol, ketones such as acetone and methyl ethyl ketone, ethers, aliphatic, aromatic and alicyclic hydrocarbons such as benzene, toluene, xylene, chloroform, pentane, hexane and cyclohexane, and mixtures of at least two of these.

In the step (a) of the invention, the first solution containing a titanium alkoxide is mixed with the diol, for example, by stirring, preferably at a temperature of from 20 to 80° C. With this, there is prepared a second solution containing a titanium complex formed by a reaction of the titanium alkoxide with the diol. As stated above, titania alkoxides in general have very fast hydrolysis rates. Therefore, if water is added to a titanium alkoxide solution itself in order to hydrolyze the titanium alkoxide, a white precipitate tends to occur in the solution. If a titania sol prepared by hydrolyzing only titanium alkoxide is mixed with another sol of silica and/or alumina, the resultant sol mixture not according to the present invention tends to turn into a gel in a short period of time. Thus, it becomes difficult to form a transparent film. In contrast, according to the present invention, the first solution containing a titanium alkoxide is mixed with the above-mentioned mentioned special diol. With this, a titanium complex is formed by a reaction of the titanium alkoxide with the diol. In fact, the diol becomes a ligand of this titanium complex. A titania sol prepared by hydrolyzing this titanium complex becomes unexpectedly stable and thus does not generate a white precipitate. Furthermore, a sol mixture (coating liquid) prepared by mixing this titania sol with the second sol (i.e., at least one of a silica sol and an alumina sol) also becomes unexpectedly stable. Thus, it becomes possible to obtain a transparent hydrophilic film. This special coating liquid does not hydrolyze by moisture in the air, and thus becomes stable during storage. Furthermore, titania crystallizes to a certain desired degree after the formation of the precursory film of the step (d) or the hydrophilic film of the step (e), by the use of the special diol as a ligand of the titanium complex. Therefore, the hydrophilic film according to the invention becomes substantially superior in photocatalytic activity.

In the invention, the molar ratio of the diol to the titanium alkoxide is preferably from 1:1 to 8:1. If this ratio is less than 1:1, the titania sol may become insufficient in stability. If this ratio is greater than 8:1, too many void spaces may occur in the hydrophilic film due to the decomposition of the diol in the step (e). Thus, this hydrophilic film may become insufficient in abrasion resistance.

In the invention, in case that a titanium alkoxide represented by a general formula of $(R_6)_a Ti(OR_7)_{4-a}$, wherein $R_6$ is $C_m H_{2m+1}$ where m is from 1 to 5, and $R_7$ is $C_n H_{2n+1}$ where n is from 1 to 5, is reacted with the diol represented by the above general formula (1) or (2), a titanium complex represented by the following general formula (3) or (4) can be produced.

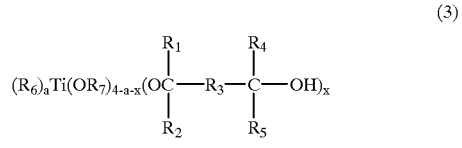

(3)

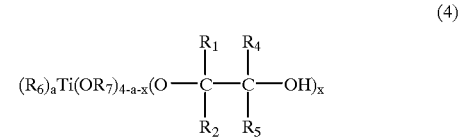

(4)

In the invention, the titania complex may be hydrolyzed in the step (b) by adding water. This water is preferably in an amount such that the molar ratio of this water to the titanium alkoxide of the step (a) is from about 1:1 to about 4:1. If the amount of this water is insufficient, the degree of hydrolysis of the titania complex may become insufficient. If the amount of this water is excessive, the resultant sol may become inferior in stability.

In the invention, it is preferable to make the second solution obtained by the step (a) acid, prior to the step (b), in order to stabilize the titanium complex. An acid to make it acid is not particularly limited, and nonlimitative examples of this acid are hydrochloric acid, sulfuric acid, and acetic acid. In the step (b), water is added to the second solution, and then the resultant mixture may be stirred at a temperature of from to 80° C., thereby to hydrolyze the titanium complex. With this, the titania sol is prepared.

In the invention, the first sol is preferably in an amount of 60–90 wt % on an oxide basis, and the second sol is preferably in an amount of 40–10 wt % on an oxide basis. The total of the first and second sols, on an oxide basis, is 100 wt %. If the amount of the second sol is less than this range, the hydrophilic film may become insufficient in hydrophilicity when the hydrophilic film is not irradiated with light. If the amount of the second sol is greater than this range, the hydrophilic film may become insufficient in photocatalytic activity to decompose contaminants attached to the surface of the hydrophilic film.

In the invention, the second sol which is at least one of a silica sol and an aluminum sol may be of the oligomer or prepolymer type prepared from silicon alkoxide and/or aluminum alkoxide. Furthermore, the second sol may be a colloidal solution having silica and/or alumina colloidal particles dispersed therein. Still furthermore, the second sol may be selected from commercial products. Exemplary commercial product names of the silica sol used as the second sol are SUPER-CERA of Daihachi Kagaku Kogyosho Co., CERAMICA of Nichi-ita Kenkyusho Co., HAS and COLCOAT 6P of Col Coat Co., ATRON SiN-500 of Nippon Soda Co., Ltd., CGS-DI-0600 of Chisso Co., and SNOWTEX of Nissan Chemical Industries, Ltd. Exemplary commercial product names of the alumina sol used as the second sol are ALUMINA SOL 100, ALUMINA SOL 200 and ALUMINA SOL 500 of Nissan Chemical Industries, Ltd., and CATALLOID AS-3 of Shokubai Kasei Kogyo Co. The titania sol (first sol) of the invention is stable under acid condition. Therefore, the second sol is preferably of the acid type or of a type which becomes stable under acid condition. With this, the coating liquid (mixture of the first and second sols) becomes stable. In case that a colloidal solution is used as the second sol, it is preferable that colloidal silica particles have a particle diameter which is at least 3 nm and less than 20 nm and that alumina colloidal particles have a diameter of from 5 to 20 nm. It is actually difficult to obtain these colloidal particles having particle diameters which are less than these minimum values (3 nm and 5 nm), respectively. If these colloidal particles have particles diameters which are greater than this maximum values (20 nm), the hydrophilic film may become inferior in transparency. In the invention, it is preferable to use the first and second sols of an organic solvent based type. Exemplary commercial product names used as the silica sol of this type are MA-ST-M, IPA-ST and IPA-XS made by Nissan Chemical Industries, Ltd. By using the first and second sols of this type, the coating liquid becomes stable and thus sufficiently long in pot life. It is preferable that the coating liquid contains 0–5 wt % of water. With this, the coating liquid will not readily turn into a gel. Alternatively, the first and second sols may be of a water based type. In this case, however, the coating liquid turns into a gel about 24 hr after the mixture of the first and second sols. Therefore, it is necessary to apply the coating liquid in a short time after the preparation of the coating liquid.

As stated above, the second sol may be a type other than a colloidal solution having colloidal particles dispersed therein. In this case, the second sol of this type is preferably in an amount of not higher than 15 wt %, based on the total weight of the first and second sols on an oxide basis. If it is higher than 15 wt %, the hydrophilic film may become inferior in photocatalytic activity.

In the invention, according to need, it is optional to dilute the coating liquid with a solvent. This diluting solvent is not particularly limited, as long as it dissolves the first and is second sols. The above-mentioned examples of the organic solvent for dissolving the titanium alkoxide can be cited as examples of the diluting solvent for diluting the coating liquid.

In the invention, the material used for the substrate is not particularly limited, and can be selected from various transparent or non-transparent conventional ones such as metal, glass, and inorganic and organic resins. Furthermore, the substrate may be a mirror (i.e., a transparent substrate with a silvery backing).

In the invention, the manner of applying the coating liquid to the substrate is not particularly limited. It may be dip coating, spraying, flow coating, or spin coating. In the invention, the precursory film prepared by applying the coating liquid to the substrate is baked in the step (e) at a temperature of from 300 to 850° C. If the baking temperature is lower than 300° C., the hydrophilic film may become insufficient in hardness. If the baking temperature is higher than 850° C., titania contained in the hydrophilic film may change from the anatase type to the rutile type. With this, the hydrophilic film may become insufficient in photocatalytic activity.

In the invention, it is preferable that the hydrophilic film has a thickness of from 20 to 300 nm. If it is less than 20 nm, it may become insufficient in hydrophilicity. If it is greater than 300 nm, cracks may occur thereon during the baking. Thus, it may not become a transparent film. In the invention, it is optional to form a metal oxide (e.g., silica) film on the substrate and then form the hydrophilic film on this metal oxide film.

It is preferable that the light source contains ultraviolet rays having wavelengths of up to 400 nm, in order to decompose contaminants by the photocatalytic activity of titania. Examples of the light source usable in the invention are sunbeam, mercury lamp, fluorescent lamp, halogen lamp, xenon short-arc lamp, and laser beam. In the invention, it is not necessary to provide an artificial light source for enhancing the photocatalytic activity, but the natural light such as sunbeam or the light from an interior fluorescent lamp for illumination will suffice. It is, however, optional to provide an artificial light source in a manner that the hydrophilic film is directly exposed to the light rays from the light source.

In contrast to the invention, if a first titanium complex not according to the invention is prepared by a reaction of a titanium alkoxide with an amino compound such as diethanol amine, the ligand (amino compound) of the first titanium complex is stable under the basic condition. In contrast, the second sol (i.e., silica sol and/or alumina sol) is generally stable under the acid condition. Therefore, the coating liquid prepared by using the first titanium complex turns into a gel, and thus it becomes impossible to form a transparent hydrophilic film. If a second titanium complex not according to the invention is prepared by a reaction of a titanium alkoxide with ethylene glycol, the ligand (ethylene glycol) of the second titanium complex is stable under the acid condition. Therefore, the hydrophilic film becomes transparent, but is not always superior in photocatalytic activity. In contrast, according to the invention, due to the use of the abovementioned special diol, the coating liquid becomes substantially stable, and furthermore the hydrophilic film becomes substantially superior in photocatalytic activity.

The following nonlimitative examples are illustrative of the present invention.

EXAMPLE 1

In this example, a coating liquid was prepared by mixing a titanium sol (first sol) according to the invention with a silica sol (second sol), as follows.

At first, titanium tetraisopropoxide was dissolved in ethanol such that its concentration was 0.5 mol/L. Then, 1,3-butane diol (ligand) was added to this solution such that its concentration was 0.5 mol/L. Then, the resultant solution was refluxed for 1.5 hr. Then, the solution was cooled down to room temperature, followed by the addition of 70% nitric acid such that its concentration was 0.1 mol/L. After that, water was added dropwise to the resultant solution such that its concentration was 0.5 mol/L, followed by reflux for 1.5 hr. With this, there was obtained a titania sol according to the invention. This titania sol was mixed with a colloidal silica in an amount of 30 wt %, based on the total weight of the titania sol and the colloidal silica, on an oxide basis. As this colloidal silica, there was used IPA-S (trade name) which is made by Nissan Chemical Industries, Ltd. and has a particle diameter of from 8 to 11 nm. The resultant mixture was diluted with 1-butanol such that the solid concentration was 3 wt %, thereby to prepare the coating liquid.

Separately, a clear float glass substrate having widths of 100 mm and a thickness of 1.9 mm was washed with neutral detergent, then water and then ethanol, and then dried. Then, a silica thin film having a thickness of 80 nm was formed on the substrate by a known method. Then, the coating liquid was applied to the silica film by spin coating with a spinning rate of 1,000 rpm/min. The obtained precursor film was air-dried and then baked at a temperature of 600° C. for 10 min.

The obtained hydrophilic film had a thickness of 120 nm and was transparent. The contact angle of a water drop disposed on the hydrophilic film was 3 degrees. Then, a breath was expelled onto the hydrophilic film, but it caused no cloud thereon. After allowing the coated substrate (hydrophilic article) to stand still in a darkroom for 24 hr, the contact angle became 7 degrees. Then, no cloud occurred thereon by the same exhalation test. The hydrophilic article was dipped into a solution containing 5% of oleic acid dissolved in acetone. After this dipping, the contact angle thereon became at least 30 degrees. Then, this hydrophilic article was subjected to the same exhalation test, and it caused cloud thereon. Then, this hydrophilic article was irradiated with ultraviolet rays for 12 hr with a xenon lamp at an intensity of 0.5 mW/cm$^2$. After that, the contact angle thereon became 9 degrees. Then, this hydrophilic article was subjected to the same exhalation test, and it caused no cloud thereon.

The silica sol (colloidal silica) used in each of this example and the after-mentioned Examples 2–3 was organic solvent based, and thus the water content of each coating liquid was not higher than 5 wt %. In each of this example and Examples 2–3, it was possible to form a transparent hydrophilic film by using the coating liquid which had been stored in a tightly sealed container for 2 weeks at room temperature.

EXAMPLE 2

In this example, Example 1 was repeated except in that 2-methyl-2,4-pentanediol was used as the ligand, in place of 1,3-butanediol. With this, there was obtained a transparent hydrophilic film having a thickness of 120 nm.

The obtained hydrophilic film was subjected to the same evaluation tests as those of Example 1. The initial contact angle was 3 degrees, and no cloud occurred thereon by the exhalation test. The contact angle was 8 degrees after standing still in a darkroom for 24 hr, and no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 10 degrees, and then no cloud occurred thereon by the exhalation test.

EXAMPLE 3

In this example, Example 1 was repeated except in that 2,2,4-trimethyl-1,3-pentanediol was used as the ligand, in place of 1,3-butanediol. With this, there was obtained a transparent hydrophilic film having a thickness of 110 nm.

The obtained hydrophilic film was subjected to the same evaluation tests as those of Example 1. The initial contact angle was 3.5 degrees, and no cloud occurred thereon by the exhalation test. The contact angle was 8 degrees after standing still in a darkroom for 24 hr, and no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 7 degrees, and then no cloud occurred thereon by the exhalation test.

EXAMPLE 4

In this example, Example 1 was repeated except in that the colloidal silica was replaced with an alumina sol in which colloidal particles are dispersed. In fact, there was used as this alumina sol ALUMINA SOL 520 (trade name) of Nissan Chemical Industries Ltd., having a particle diameter of from 10 to 20 nm. In this example, there was obtained a transparent hydrophilic film having a thickness of 110 nm.

The obtained hydrophilic film was subjected to the same evaluation tests as those of Example 1. The initial contact angle was 4.5 degrees, and no cloud occurred thereon by the exhalation test. The contact angle was 13 degrees after standing still in a darkroom for 24 hr, and then cloud occurred thereon by the exhalation test, but disappeared immediately. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 10 degrees, and then no cloud occurred thereon by the exhalation test.

The alumina sol used in this example was water based, and thus the water content of the coating liquid was at least 10 wt %. Therefore, the coating liquid of this example was not so stable as those of Examples 1–3. However, it was possible to form a transparent hydrophilic film by using the coating liquid which had been stored in a tightly sealed container for a period of time of up to 24 hr at room temperature.

EXAMPLE 5

In this example, Example 1 was repeated except in that the colloidal silica was replaced with a combination of the alumina sol used in Example 4 and a silica sol, that is, IPA-XS (trade name) of Nissan Chemical Industries Ltd., having a particle diameter of from 4 to 6 nm. In this example, 70 wt % of the titania sol was mixed with 10 wt % of the alumina sol and 20 wt % of the silica sol, and the amount of each sol was based on the total weight of the titania sol, the alumina sol and the silica sol, on an oxide basis. In this example, there was obtained a transparent hydrophilic film having a thickness of 120 nm.

The obtained hydrophilic film was subjected to the same evaluation tests as those of Example 1. The initial contact angle was 4 degrees, and no cloud occurred thereon by the exhalation test. The contact angle was 12 degrees after standing still in a darkroom for 24 hr, and then cloud occurred thereon by the exhalation test, but disappeared immediately. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 9 degrees, and then no cloud occurred thereon by the exhalation test.

In this example, it was possible to form a transparent hydrophilic film by using the coating liquid which had been stored in a tightly sealed container for a period of time of up to 24 hr at room temperature.

EXAMPLE 6

In this example, Example 1 was repeated except in that the colloidal silica was replaced with a combination of the silica sol of Example 5 (IPA-XS) and another silica sol, that is, COLCOAT 6P (trade name) of Col Coat Co. In this example, 80 wt % of the titania sol was mixed with 10 wt % of IPA-XS and 10 wt % of COLCOAT 6P, and the amount of each sol was based on the total weight of the titania sol and these two silica sols, on an oxide basis. In this example, there was obtained a transparent hydrophilic film having a thickness of 110 nm.

The obtained hydrophilic film was subjected to the same evaluation tests as those of Example 1. The initial contact angle was 4 degrees, and no cloud occurred thereon by the exhalation test. The contact angle was 6 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 8 degrees, and then no cloud occurred thereon by the exhalation test.

In each of this example and the after-mentioned Examples 7–11, it was possible to form a transparent hydrophilic film by using the coating liquid which had been stored in a tightly sealed container for two weeks at room temperature.

EXAMPLE 7

In this example, Example 6 was repeated except in that 80 wt % of the titania sol was mixed with 5 wt % of IPA-XS and wt % of COLCOAT 6P. In this example, there was obtained a transparent hydrophilic film having a thickness of 110 nm.

The obtained hydrophilic film was subjected to the same evaluation tests as those of Example 1. The initial contact angle was 4 degrees, and no cloud occurred thereon by the exhalation test. The contact angle was 9 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 10 degrees, and then no cloud occurred thereon by the exhalation test.

EXAMPLE 8

In this example, Example 1 was repeated except in that the amount of 1,3-butanediol was changed such that its concentration was 1.5 mol/L. In this example, there was obtained a transparent hydrophilic film having a thickness of 130 nm.

The obtained hydrophilic film was subjected to the same evaluation tests as those of Example 1. The initial contact angle was 3.5 degrees, and no cloud occurred thereon by the exhalation test. The contact angle was 7 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 10 degrees, and then no cloud occurred thereon by the exhalation test.

EXAMPLE 9

In this example, Example 1 was repeated except in that the amount of 1,3-butanediol was changed such that its concentration was 4.0 mol/L. In this example, there was obtained a transparent hydrophilic film having a thickness of 130 nm.

The obtained hydrophilic film was subjected to the same evaluation tests as those of Example 1. The initial contact angle was 3.5 degrees, and no cloud occurred thereon by the exhalation test. The contact angle was 8 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 9 degrees, and then no cloud occurred thereon by the exhalation test.

EXAMPLE 10

In this example, Example 1 was repeated except in that the amounts of the titania and silica sols were respectively 90 wt % and 10 wt %. In this example, there was obtained a transparent hydrophilic film having a thickness of 130 nm.

The obtained hydrophilic film was subjected to the same evaluation tests as those of Example 1. The initial contact angle was 4 degrees, and no cloud occurred thereon by the exhalation test. The contact angle was 10 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 6 degrees, and then no cloud occurred thereon by the exhalation test.

EXAMPLE 11

In this example, Example 1 was repeated except in that the amounts of the titania and silica sols were respectively 60 wt % and 40 wt %. In this example, there was obtained a transparent hydrophilic film having a thickness of 130 nm.

The obtained hydrophilic film was subjected to the same evaluation tests as those of Example 1. The initial contact angle was 4 degrees, and no cloud occurred thereon by the exhalation test. The contact angle was 6 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 11 degrees, and then no cloud occurred thereon by the exhalation test.

EXAMPLE 12

In this example, Example 4 was repeated except in that the amounts of the titania and alumina sols were respectively 60 wt % and 40 wt %. In this example, there was obtained a transparent hydrophilic film having a thickness of 130 nm.

The obtained hydrophilic film was subjected to the same evaluation tests as those of Example 1. The initial contact angle was 4 degrees, and no cloud occurred thereon by the exhalation test. The contact angle was 10 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 11 degrees, and then no cloud occurred thereon by the exhalation test.

In each of Examples 1–12, the hydrophilic film was subjected to an abrasion resistance test. In this test, eight kinds dust (clay soil dust of Kanto Loam in Japan) for industrial test was applied to a piece of cotton cloth. Then, this piece was firmly rubbed against the hydrophilic film by 20 times of reciprocation, using a hand. With this, almost no scratches occurred on the hydrophilic film in each of Examples 6–7, and a couple of inconspicuous scratches occurred thereon in each of Examples 1–5 and 8–12.

Comparative Example 1

In this comparative example, it was tried to prepare the coating liquid in the same manner as that of Example 1, except in that diethanol amine was used as the ligand, in place of 1,3-butanediol. However, immediately after the addition of the silica sol to the titania sol, the resultant mixture turned into a gel. Thus, it was not possible to apply the coating liquid to the substrate.

Comparative Example 2

In this comparative example, Example 1 was repeated except in that ethylene glycol was used as the ligand, in place of 1,3-butanediol. In this example, there was obtained a transparent hydrophilic film having a thickness of 110 nm.

The obtained hydrophilic film was subjected to the same evaluation tests as those of Example 1. The initial contact angle was 3.5 degrees, and no cloud occurred thereon by the exhalation test. The contact angle was 8 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 17 degrees, and then cloud occurred thereon by the exhalation test.

Comparative Example 3

In this comparative example, Example 1 was repeated except in that 2-(2-methoxyethoxy) ethanol was used as the ligand, in place of 1,3-butanediol. In this example, there was obtained a transparent hydrophilic film having a thickness of 110 nm.

The obtained hydrophilic film was subjected to the same evaluation tests as those of Example 1. The initial contact angle was 2.5 degrees, and no cloud occurred thereon by the exhalation test. The contact angle was 7 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 23 degrees, and then cloud occurred thereon by the exhalation test.

Comparative Example 4

In this comparative example, Example 6 was repeated except in that 55 wt % of the titania sol was mixed with 10 wt % of IPA-XS and 35 wt % of COLCOAT 6P. In this example, there was obtained a transparent hydrophilic film having a thickness of 110 nm.

The obtained hydrophilic film was subjected to the same evaluation tests as those of Example 1. The initial contact angle was 4 degrees, and no cloud occurred thereon by the exhalation test. The contact angle was 13 degrees after standing still in a darkroom for 24 hr, and then cloud occurred thereon by the exhalation test, but disappeared immediately. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 23 degrees, and then cloud occurred thereon by the exhalation test.

Comparative Example 5

In this comparative example, it was tried to prepare the coating liquid in the same manner as that of Example 1, except in that the amount of 1,3-butanediol was changed such that its concentration was 0.2 mol/L. However, immediately after the addition of the silica sol to the titania sol, the resultant sol mixture turned into a gel. Therefore, it was not possible to apply the coating liquid to the substrate.

Comparative Example 6

In this comparative example, Example 1 was repeated except in that the amount of 1,3-butanediol was changed such that its concentration was 5.5 mol/L. In this example, there was obtained a transparent hydrophilic film having a thickness of 130 nm.

The obtained hydrophilic film was subjected to the same evaluation tests as those of Example 1. Similar to Example 1, the results of the evaluation tests were satisfactory. Furthermore, the hydrophilic film was subjected to the same abrasion test as that of Examples 1–12. After this test, there occurred a couple of scratches which were conspicuous even under an interior light.

Comparative Example 7

In this comparative example, Example 1 was repeated except in that the amounts of the titania and silica sols were respectively 95 wt % and 5 wt %. In this example, there was obtained a transparent hydrophilic film having a thickness of 110 nm.

The obtained hydrophilic film was subjected to the same evaluation tests as those of Example 1, except the dipping and subsequent ultraviolet irradiation test. The initial contact angle was 4 degrees, and no cloud occurred thereon by the exhalation test. The contact angle was 20 degrees after standing still in a darkroom for 24 hr, and then cloud occurred thereon by the exhalation test.

Comparative Example 8

In this comparative example, Example 1 was repeated except in that the amounts of the titania and silica sols were respectively 50 wt % and 50 wt %. In this example, there was obtained a transparent hydrophilic film having a thickness of 130 nm.

The obtained hydrophilic film was subjected to the same evaluation tests as those of Example 1. The initial contact angle was 4 degrees, and no cloud occurred thereon by the exhalation test. The contact angle was 7 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 25 degrees, and then cloud occurred thereon by the exhalation test.

Comparative Example 9

In this comparative example, Example 4 was repeated except in that the amounts of the titania and alumina sols were respectively 50 wt % and 50 wt %. In this example, there was obtained a slightly cloudy hydrophilic film having a thickness of 130nm.

The obtained hydrophilic film was subjected to the same evaluation tests as those of Example 1. The initial contact angle was 4 degrees, and no cloud occurred thereon by the exhalation test. The contact angle was 9 degrees after standing still in a darkroom for 24 hr, and then no cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 30 degrees, and then cloud occurred thereon by the exhalation test.

Comparative Example 10

In this comparative example, Example 1 was repeated except in that there was used a colloidal silica called MA-ST-M (trade name) of Nissan Chemical Industries Ltd. having a particle diameter of from 20 to 30 nm, in place of IPA-S. In this example, there was obtained a slightly white hydrophilic film having a thickness of 130 nm.

The obtained hydrophilic film was subjected to the same evaluation tests as those of Example 1. The initial contact angle was 4 degrees, and no cloud occurred thereon by the exhalation test. The contact angle was 17 degrees after standing still in a darkroom for 24 hr, and then cloud occurred thereon by the exhalation test. The contact angle became at least 30 degrees after dipping in the oleic acid solution, and then cloud occurred thereon by the exhalation test. Then, this hydrophilic film was subjected to the same ultraviolet irradiation as that of Example 1. After that, the contact angle was found to be 20 degrees, and then cloud occurred thereon by the exhalation test.

What is claimed is:

1. A coating liquid for forming a hydrophilic film, said coating liquid comprising:
   a first sol which is a titania sol; and
   a second sol which is at least one of a silica sol and an alumina sol,
   wherein said titania sol is prepared by a method comprising the following sequential steps of:
   (a) mixing a first solution containing a titanium alkoxide with a diol represented by at least one of the following general formulas (1) and (2), thereby to prepare a second solution containing a titanium complex formed by a reaction of said titanium alkoxide with said diol; and
   (b) hydrolyzing said titanium complex in said second solution, thereby to prepare said titania sol,

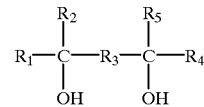
(1)

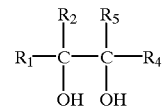
(2)

wherein $R_1$ is H or $C_pH_{2p+1}$ where p is from 1 to 5, $R_2$ is $C_qH_{2q+1}$ where q is from 1 to 5, $R_3$ is $C_rH_{2r}$ where r is from 1 to 3, $R_4$ is H or $C_xH_{2x+1}$ where x is from 1 to 5, and $R_5$ is H or $C_yH_{2y+1}$ where y is from 1 to 5.

2. A coating liquid according to claim 1, wherein in the step (a) a molar ratio of said diol to said titanium alkoxide is from 1:1 to 8:1.

3. A coating liquid according to claim 1, wherein said first sol is in an amount of 60–90 wt % on an oxide basis, and said second sol is in an amount of 40–10 wt % on an oxide basis.

4. A coating liquid according to claim 1, wherein said silica sol of said second sol comprises a colloidal silica.

5. A coating liquid according to claim 4, wherein said colloidal silica has a particle diameter which is at least 3 nm and less than 20 nm.

6. A coating liquid according to claim 5, wherein said colloidal silica has a particle diameter of from about 4 to about 11 nm.

7. A coating liquid according to claim 1, wherein said alumina sol of the second sol comprises alumina colloidal particles.

8. A coating liquid according to claim 7, wherein said alumina colloidal particles have a diameter of from 5 to 20 nm.

9. A coating liquid according to claim 1, wherein said silica sol comprises silica colloidal particles, and said alumina sol comprises alumina colloidal particles.

10. A coating liquid according to claim 9, wherein said silica colloidal particles have a diameter which is at least 3 nm and less than 20 nm, and said alumina colloidal particles have a diameter of from 5 to 20 nm.

11. A coating liquid according to claim 1, wherein said diol of the step (a) is at least one compound selected from the group consisting of 2-ethyl-1,3-hexanediol, 2,2,4-trimethyl-1,3-pentanediol, 1,2-butanediol, 1,3-butanediol, 2,3-butanediol, and 2-methyl-2,4-pentanediol.

12. A coating liquid according to claim 1, wherein said titanium alkoxide of the step (a) has a carbon atom number of from 1 to 5 in the molecule.

13. A coating liquid according to claim 1, which contains 0–5 wt % of water.

14. A method for producing a coating liquid used for forming a hydrophilic film, said coating liquid comprising a first sol which is a titania sol and a second sol which is at least one of a silica sol and an alumina sol, said method comprising the following the sequential steps of:

(a) mixing a first solution containing a titanium alkoxide with a diol represented by at least one of the following general formulas (1) and (2), thereby to prepare a second solution containing a titanium complex formed by a reaction of said titanium alkoxide with said diol;

(b) hydrolyzing said titanium complex in said second solution, thereby to prepare said titania sol; and (c) mixing said titania sol with said second sol,

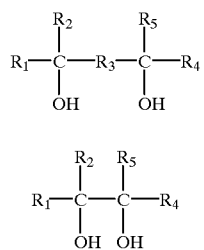

wherein $R_1$ is H or $C_pH_{2p+1}$ where p is from 1 to 5, $R_2$ is $C_qH_{2q+1}$ where q is from 1 to 5, $R_3$ is $C_rH_{2r}$ where r is from 1 to 3, $R_4$ is H or $C_xH_{2x+1}$ where x is from 1 to 5, and $R_5$ is H or $C_yH_{2y+1}$ where y is from 1 to 5.

15. A method according to claim 14, wherein the step (a) is conducted at a temperature of from 20 to 80°.

16. A method according to claim 14, wherein the step (b) is conducted by adding water to said second solution of the step (a).

17. A method according to claim 16, wherein a molar ratio of said water used in the step (b) to said titanium alkoxide of the step (a) is from about 1:1 to about 4:1.

18. A method according to claim 16, wherein said second solution of the step (a) is acidified prior to the addition of said water thereto.

19. A method according to claim 16, wherein a mixture of said second solution of the step (a) and water is stirred at a temperature of from 20 to 80° C., thereby hydrolyzing said titanium complex of the step (a).

20. A method for forming a hydrophilic film on a substrate, said method comprising the following the sequential steps of:

(a) mixing a first solution containing a titanium alkoxide with a diol represented by at least one of the following general formulas (1) and (2), thereby to prepare a second solution containing a titanium complex formed by a reaction of said titanium alkoxide with said diol;

(b) hydrolyzing said titanium complex in said second solution, thereby to prepare a titania sol which is a first sol;

(c) mixing said first sol with a second sol which is at least one of a silica sol and an alumina sol, thereby to prepare a coating liquid;

(d) applying said coating liquid to the substrate, thereby to form a precursory film thereon; and (e) baking said precursory film at a temperature of from 300 to 850° C., thereby to form the hydrophilic film thereon,

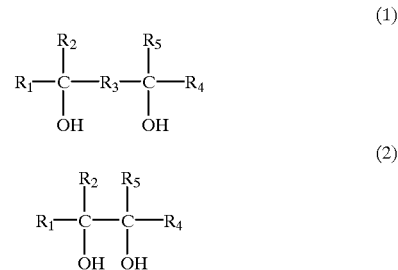

wherein $R_1$ is H or $C_pH_{2p+1}$ where p is from 1 to 5, $R_2$ is $C_qH_{2q+1}$ where q is from 1 to 5, $R_3$ is $C_rH_{2r}$ where r is from 1 to 3, $R_4$ is H or $C_xH_{2x+1}$ where x is from 1 to 5, and $R_5$ is H or $C_yH_{2y+1}$ where y is from 1 to 5.

21. A hydrophilic article comprising:

a substrate; and a hydrophilic film formed on said substrate by the method of claim 20.

22. A hydrophilic article according to claim 21, wherein said hydrophilic film has a thickness of from 20 to 300 nm.

23. A hydrophilic article according to claim 21, further comprising a metal oxide film interposed between said substrate and said hydrophilic film.

24. A hydrophilic article according to claim 23, wherein said metal oxide film is made of silica.

* * * * *

UNITED STATES PATENT AND TRADEMARK OFFICE
CERTIFICATE OF CORRECTION

PATENT NO.   : 6,110,269
DATED        : August 29, 2000
INVENTOR(S)  : Satoko Sugawara, et al.

It is certified that error appears in the above-identified patent and that said Letters Patent is hereby corrected as shown below:

<u>Title page, item [30],</u>
Under Foreign Application Priority Data, change the filing date, for Japanese Application no. 9-009901, from January 22, 1997 to -- January 23, 1997 --.

Signed and Sealed this

Second Day of October, 2001

*Attest:*

*Nicholas P. Godici*

NICHOLAS P. GODICI
*Attesting Officer*          *Acting Director of the United States Patent and Trademark Office*